No. 819,620. PATENTED MAY 1, 1906.
M. O. TROY.
METHOD OF OPERATING CONSTANT CURRENT TRANSFORMERS.
APPLICATION FILED DEC. 12, 1903.

Witnesses:
George P. Thornton.
Helen Orford

Inventor:
Matthew O. Troy,
by Albert G. Davis
Atty.

UNITED STATES PATENT OFFICE.

MATTHEW O. TROY, OF SCHENECTADY, NEW YORK, ASSIGNOR TO GENERAL ELECTRIC COMPANY, A CORPORATION OF NEW YORK.

METHOD OF OPERATING CONSTANT-CURRENT TRANSFORMERS.

No. 819,620.      Specification of Letters Patent.      Patented May 1, 1906.

Application filed December 12, 1903. Serial No. 184,892.

*To all whom it may concern:*

Be it known that I, MATTHEW O. TROY, a citizen of the United States, residing at Schenectady, in the county of Schenectady and State of New York, have invented certain new and useful Improvements in Methods of Operating Constant-Current Transformers, of which the following is a specification.

My present invention relates to constant-current transformers, and more especially to those in which the regulation is attained through the use of relative movable primary and secondary coils. In such transformers the power factor is high at or near full load, but becomes poor at partial loads. This characteristic of such transformers therefore imposes more or less serious difficulty in cases where the maximum load for the transformers is less than that for which the transformer is designed. Thus, for example, in laying out an installation it may be desired in anticipation of a future increased demand to provide a transformer larger than necessary to take care of the load supplied at first. Such a partial load, however, even when it is all in circuit, operates at comparatively low power factor.

To obviate the objections mentioned, I have devised a method of winding such a transformer and bringing out taps therefrom such as will permit the transformer to be operated at any fraction of its full-load capacity with practically full-load power factor and without sacrificing anything as to range of regulation.

The novel features whereby this result is accomplished I have pointed out with particularity in the appended claims. The invention itself, however, will be best understood by reference to the following description, taken in connection with the accompanying drawings, in which—

Figure 1:
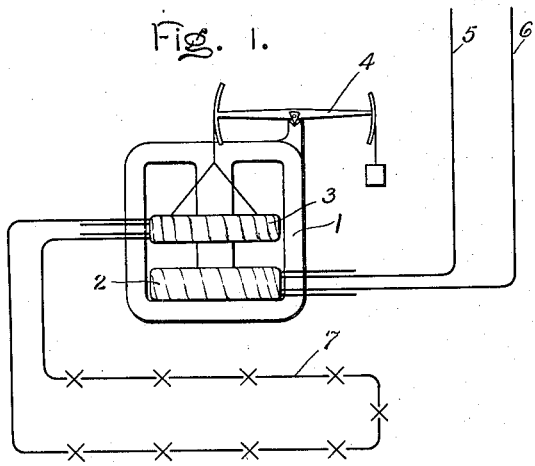
Figure 2:
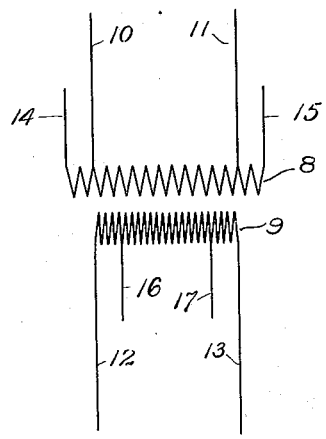

Figure 1 represents a constant-current transformer constructed in accordance with my invention, while Fig. 2 is a diagram of the windings of the transformer, showing the taps extending therefrom.

Where it is desired to operate a constant-current transformer at a variable load the maximum of which is less than the maximum load for which it is designed, a poor power factor results unless an arrangement such as that which forms the subject of the present invention is used to prevent it.

At first thought, in order to raise the power factor, it might seem sufficient to cut out turns on the secondary, so as to bring down the maximum voltage to that required by the reduced maximum load to be supplied by the transformer. Under these conditions, however, a considerably reduced range of regulation is possible, for the reason that while the induced voltage is decreased directly with the reduction in turns the reactive voltage on which the regulation depends is reduced as the square of the turns. Thus it will be seen that upon decreasing the load upon the transformer a point is very soon reached beyond which due to the lessened reactive voltage the current in the constant-current circuit commences to increase above its normal value. The transformer at this point therefore ceases to regulate.

If instead of changing the ratio of transformation by omitting secondary turns turns were to be added to the primary, the secondary turns remaining constant, there would result on the full-load operation an excessive minimum reactance, which would produce a poor full-load power factor.

I accomplish the result aimed at without the objections met with either in reducing the secondary turns or increasing the primary turns. By my method of operation the number of secondary turns is reduced by a suitable amount, and at the same time the number of primary turns is increased also by a suitable amount. By such an arrangement the transformer may operate at a load the maximum of which is less than the rated load of the transformer in normal condition and does so both at a high power factor and without sacrificing its range of regulation.

In the drawings a constant-current transformer with relative movable coils is shown as consisting of the core 1, a primary coil 2, and a movable secondary coil 3. The secondary coil has its weight partially counterbalanced by means of the weighted lever 4. The construction of transformers of this character is well understood in the art, so that it will be unnecessary, therefore, to point out in further detail the various ways of constructing such a transformer. The transformer is shown as having its primary connected to supply-mains 5 and 6 and its secondary to a series consumption circuit 7 containing lights or other current-consuming devices.

In Fig. 2 a diagrammatic representation of the primary and secondary windings is shown. In this diagram the primary corresponding to the primary 2 in Fig. 1 is indicated at 8 and the secondary at 9. The leads 10 and 11 represent the connections to the primary winding corresponding to the normal maximum loads for which the transformer is designed, while in the same way the leads 12 and 13 represent the corresponding connections for the secondary. At each end of the primary winding additional turns are provided, from which at one end of the winding extends the terminal 14 and at the other end the terminal 15. By shifting the connections of one of the supply-leads to one of these terminals one-half of these additional turns will be put in circuit, while if the other supply-lead is shifted to the other terminal the remainder of the additional turns is included. In a somewhat analogous manner the taps 16 and 17, extending from the secondary 9, permit portions of the secondary to be left out of circuit when corresponding connections are made between the tap or taps and the secondary leads.

As has already been mentioned, the leads 10 and 11 correspond to the normal connection of the primary and the leads 12 and 13 to the normal connection of the secondary when the transformer is used at its full-rated capacity. Suppose now that the maximum load for the transformer is to be not over, say, seventy-five per cent. of its rated capacity. The secondary lead 12 may then be connected to the tap 16, so as to reduce the induced secondary voltage, while at the same time the primary lead 10 is connected to the terminal 14, thus adding turns to the primary. The transformer will thus operate at a lower maximum secondary voltage, corresponding to the reduced load. The range of regulation will be substantially the same as before, because the reactance of the transformer will be reduced in substantially the same proportion, and the power factor at the reduced maximum load will be substantially the same as the power factor at full-rated load due to the fact that the induced voltage corresponds in value with the load and is not reduced in value by reactive voltage, as would be necessary if a normallly connected transformer were to supply the same load.

If a still smaller maximum load is to be supplied by the transformer, another section of the secondary may be cut out by connecting the lead 13 with the tap 17 and more turns added to the primary by connecting the lead 11 with the terminal 15. It is evident that more taps may be provided on the secondary and more additional turns on the primary in order to operate at still lower loads. It is thought to be unnecessary, however, to confuse the drawings by showing such additional taps.

What I claim as new, and desire to secure by Letters Patent of the United States, is—

1. The method of operating a constant-current transformer at a maximum load less than that corresponding to the full load for which the transformer is designed, which consists in utilizing less than the full number of secondary turns and adding to the number of primary turns normally employed.

2. The method of operating a constant-current transformer below full-load capacity, and at a high power factor, which consists in changing the ratio of transformation by varying both the number of primary turns and the number of secondary turns of the transformer.

3. The method of operating a constant-current transformer under varying loads, and at all times with a high power factor, which consists in preserving an approximately constant relation between the induced or internal voltage and the reactive voltage.

4. The method of operating a constant-current transformer, which consists in adjusting the induced secondary voltage to meet the demands of the load and at the same time minimizing the reactive voltage of the transformer.

In witness whereof I have hereunto set my hand this 10th day of December, 1903.

MATTHEW O. TROY.

Witnesses:
　BENJAMIN B. HULL,
　HELEN ORFORD.